United States Patent [19]
Van Kuijk

[11] Patent Number: 5,268,945
[45] Date of Patent: Dec. 7, 1993

[54] BOILING WATER REACTOR SYSTEM WITH STAGGERED CHIMNEY

[75] Inventor: Rudolf M. Van Kuijk, Cupertino, Calif.

[73] Assignee: General Electric Company, San Jose, Calif.

[21] Appl. No.: 945,123

[22] Filed: Sep. 15, 1992

Related U.S. Application Data

[60] Division of Ser. No. 776,727, Oct. 15, 1991, Pat. No. 5,180,547, which is a continuation of Ser. No. 701,645, May 15, 1991, abandoned, which is a continuation of Ser. No. 325,839, Mar. 20, 1989, abandoned.

[51] Int. Cl.$^5$ .................. G21C 15/00; G21C 15/16
[52] U.S. Cl. ................................ 376/371; 376/377
[58] Field of Search ............................ 376/370-375, 376/377-380, 403-406, 298, 299

[56] References Cited

U.S. PATENT DOCUMENTS

| | | | |
|---|---|---|---|
| 2,994,657 | 8/1961 | Petrick | 376/377 |
| 3,087,881 | 4/1963 | Treshow | 376/377 |
| 3,098,812 | 7/1963 | Treshow | 376/377 |
| 3,113,916 | 12/1963 | Abbott | 376/377 |
| 3,180,802 | 4/1965 | West et al. | 376/374 |
| 3,226,300 | 12/1965 | Zmola et al. | 376/406 |
| 3,247,650 | 4/1966 | Kornbichler | 376/377 |
| 3,284,312 | 11/1966 | West | 376/374 |
| 5,180,547 | 1/1993 | Van Kuijk | 376/377 |

OTHER PUBLICATIONS

Wilkins, D. R. et al., "Design improvements build on proven technology," Nuclear Engineering International, vol. 31, No. 383, Jun. 1986, pp. 36-45, Sutton, Surrey.

Kerntechnik, vol. 8, No. 4, Apr. 1966, p. 189, patentschau, DAS 1208833: "Siedewasserkernreaktor mit innerhalb des Reaktordruckgefässes angeordnten Dampf-Wasser-Abscheidern".

Primary Examiner—Harvey E. Behrend
Attorney, Agent, or Firm—J. S. Beulick

[57] ABSTRACT

A natural circulation boiling water reactor system comprises a reactor vessel enclosing a reactor core, for generating steam to drive a turbine which can drive a generator to generate electricity. The vessel includes a chimney for guiding the recirculating water and steam vertically above the core and a dryer for helping to remove water from steam exiting the vessel toward the turbine. In contrast to prior reactor systems, the chimney is height-staggered so that its central sections are taller than its peripheral sections. Likewise, a dryer is elevation-staggered. This staggering minimizes carryover, water in the steam flow to the turbine, and carryunder, steam in the water recirculating through the core. In addition, the staggered chimney causes the fastest recirculation flow through the hottest portions of the core. The overall effect is a more efficient reactor system.

9 Claims, 1 Drawing Sheet

BOILING WATER REACTOR SYSTEM WITH STAGGERED CHIMNEY

This is a divisional of copending allowed U.S. patent application Ser. No. 07/776,727, filed Oct. 15, 1991, now U.S. Pat. No. 5,180,547, which is a continuation of then-copending abandoned U.S. patent application Ser. No. 07/701,645, filed May 15, 1991, which is a continuation of then-copending abandoned U.S. patent application Ser. No. 07/325,839, filed Mar. 20, 1989.

BACKGROUND OF THE INVENTION

The present invention relates to energy generation systems and, more particularly, to a natural convection boiling water reactor where the reactor can be a fission reactor. More specifically, the present invention applies to boiling water reactors which utilize a chimney for the augmentation of the coolant circulation flow, and which utilize free-surface steam separation for the extraction of the steam phase used to deliver energy from the recirculating water phase.

In a boiling water reactor, heat generated by a radioactive core can be used to boil water to produce steam, which in turn can be used to drive a turbine to generate electricity. Natural convection boiling water reactors limit complexity by dispensing with the need for pumping water within the reactor vessel. The nuclear core which generates heat is immersed in water within the reactor vessel. Water circulated up through the core and a chimney above the core is at least partially converted to steam which forms a relatively low pressure head above the core. Water recirculates down a downcomer annulus between the reactor vessel and the chimney and core. The water in the downcomer is denser than the steam and water mixture in the core and chimney region. The difference in density forces circulation up through the core and chimney and down through the downcomer.

The chimney directs the steam water mixture vertically from the core. This vertical direction is best effected where the chimney includes multiple vertical sections, each of which serves as a chimney for the portion of the core directly below it. Confining the steam path in this way helps maintain a head of steam above the core, facilitating water circulation.

The steam emerging from the chimney top rises through the water in the reactor vessel and exits through a steam nozzle at the vessel top. Typically, a flat annular array of dryers is disposed near the vessel top to trap any water being carried by the steam, and return trapped water to the recirculation fluid. Otherwise, water carried by the steam would limit the efficiency with which the steam can drive a turbine or other energy conversion device. Since there is a net loss of water+steam from the vessel through the exit port, means are provided to replenish the water in the vessel. This is normally accomplished by returning condensation from the turbine using a fluid handling system, including a feed pump which pumps water through a feedwater sparger which distributes subcooled return water around the downcomer.

Two phenomena adversely affect the performance of a natural convection boiling water reactor. "Carryover" refers to water carried in the flow of steam from the vessel, while "carryunder" refers to steam carried in the flow of water recirculating within the vessel and through the core. Carryover can damage the turbine and adversely affects the efficiency with which a turbine can be driven.

Carryunder comprises steam bubbles which have a high thermal energy per unit mass so that they can impair the subcooling provided through the feedwater sparger. The result is a higher water temperature at the core entrance, and more rapid boiling of the recirculation fluid as it flows up through the core. The more rapid boiling increases the steam voids within the core. The larger voids result in higher irreversible pressure drops through the fuel bundle than would be the case with smaller voids. This effect is amplified, since the larger voids tend to choke recirculation flow, despite a higher driving head. These irreversible head losses can be compensated in the design stage by providing greater chimney height, but this results in a bigger vessel and significantly greater reactor costs.

In addition, the larger voids adversely affect core stability, as the stability-decay ratio is dependent on the proportion of two-phase pressure drop to single-phase pressure drop. This lower stability must be addressed by limiting the power production level below what might otherwise be obtainable. Furthermore, the larger voids create a negative reactivity, requiring the control rods to be withdrawn farther from the core. This reduces the opportunity to achieve long fuel burnups for a given initial core enrichment.

Carryover and carryunder both result from the inadequate separation of steam and water, generally above the chimney. Given sufficient time, the different densities of steam and water would allow adequate separation. However, water is swept along with the upward steam flow and steam is swept along with the radially outward and then downward water flow too rapidly for complete separation.

The time available for water and steam to separate can be increased either by reducing flow rates or by increasing flow distances. It is counterproductive to reduce flow rates. The steam flow rate directly impacts turbine output, while water flow impacts core void size and thus the efficiency with which neutrons generate heat. As an alternative, the reactor vessel can be made larger to accommodate longer flow paths within the vessel. However, enlarging the vessel not only increases the cost of the vessel, but requires geometrically larger versions of the multiple containment systems provided for a reactor vessel. Larger containment systems require more materials, more maintenance, and greater potential exposure of personnel to nuclear radiation or contaminants.

What is needed is a natural convection boiling water reactor system which reduces carryunder and carryover without requiring a larger reactor vessel and without reducing the flow of steam from the vessel or water through the core. In addition, the increased efficiency provided by such a reactor system should be achieved without substantial costs in terms of size, complexity or safety.

SUMMARY OF THE INVENTION

A reactor system using a height-staggered chimney, preferably in conjunction with an elevation-staggered dryer system, provides for increased steam and water separation. More specifically, more central chimney sections are taller than the more peripheral chimney sections. Preferably, the stagger becomes steeper toward the periphery.

The staggered chimney consumes less vessel volume due to the stagger and the volume saved is available to increase the time available for steam to separate from water flow. Likewise, the staggered dryer increases the volume and hence time available for water to separate from the flow of steam exiting the vessel. However, the advantages of staggering extend beyond these aggregate affects. The greater heat generated toward the core center is addressed by a correspondingly greater recirculation flow resulting from the staggered chimney.

The recirculating fluid in the vessel flows from above each chimney section outward toward the vessel wall, downward between the vessel wall and the outsides of the chimney and core to a space below the core, and upward through the core and chimney. Since the central chimney sections are further from the vessel wall than the peripheral sections, the steam from the central section has a longer time to escape the recirculation flow than does steam from the peripheral sections. The staggered chimney lengthens the peripheral paths proportionally more than the central paths, thus adding separation time where it is needed most. By making the stagger steeper toward the periphery, this advantage is enhanced.

If used with a staggered chimney, a conventional disk-shaped dryer array would leave a relatively short path over the central, tallest, chimney section. Since the central section is typically over the hottest region of the reactor core, the steam flow therethrough is typically the greatest. Hence, the conventional dryer array provides the least separation volume just where the need is the greatest. By staggering the dryer array, the steam paths can be equalized or arranged to favor the center sections to provide a more favorable carryover distribution. Furthermore, a conventional disk-shaped dryer array wastes vessel space between the dryer and the semispherical vessel top. By staggering the dryer array to conform to the vessel top, this space is reclaimed for the purpose of separating water from the steam flow. This reduces demands on the dryer array and decreases the amount of water carried to the turbine.

As an additional advantage, a staggered chimney provides a better recirculation distribution through the core. The taller central chimney sections support larger steam heads which correspond to larger pressure differential, and thus faster recirculation rates. This reduces the void fraction in the core center, improving their neutron efficiency. Thus, a given aggregate circulation rate is distributed so as to enhance efficiency.

The present invention thus provides that carryover and carryunder are decreased while circulation efficiency is increased. These objectives are accomplished without increasing vessel size, reducing flow rates, increasing system complexity. These and other features and advantages of the present invention are apparent from the description below with reference to the following drawings.

DESCRIPTION OF THE PREFERRED EMBODIMENTS

Figures 1, 2:
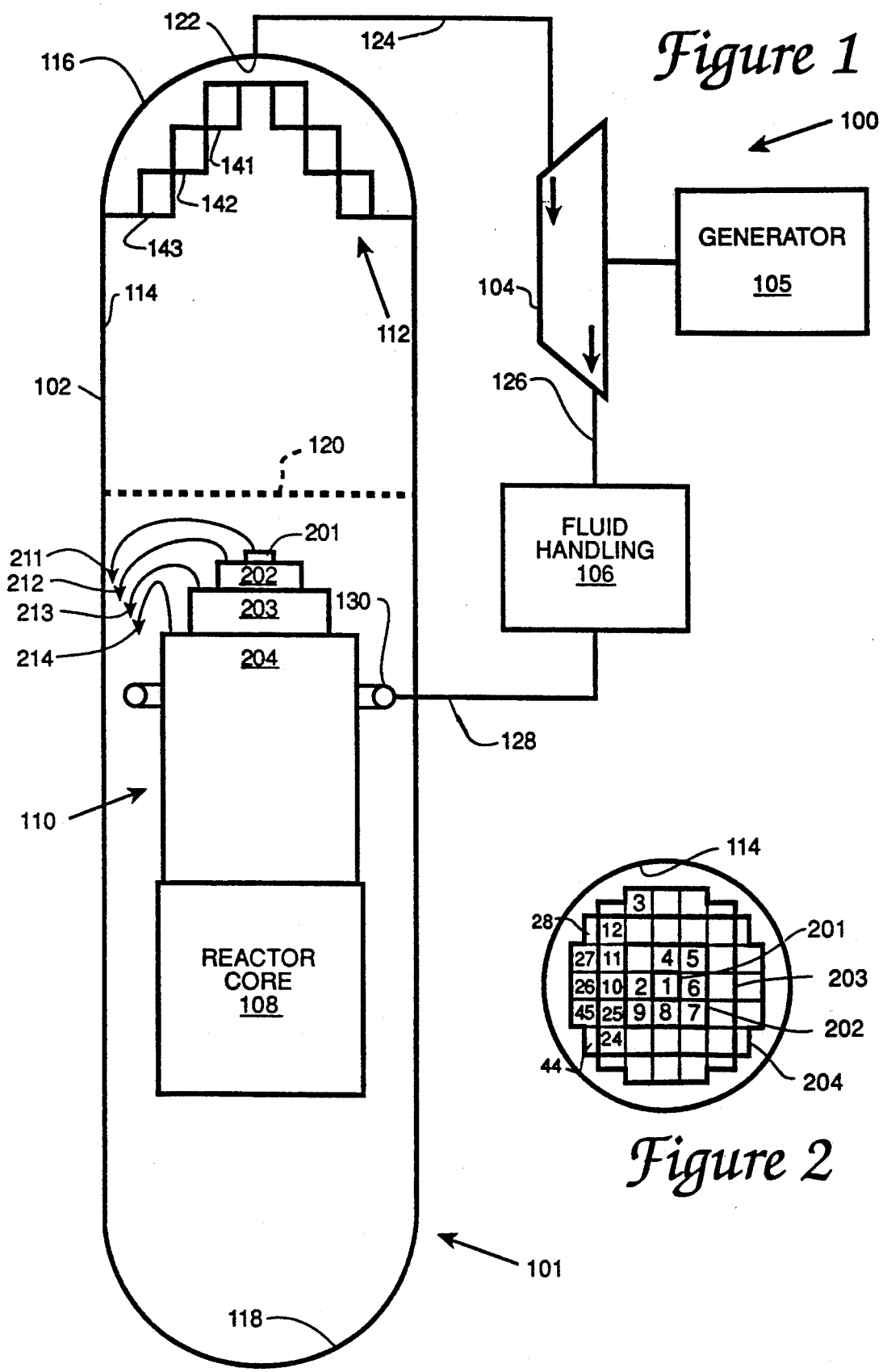
FIG. 1 is a schematic elevation view of a power generator system in accordance with the present invention.
FIG. 2 is a schematic plan view of a chimney and vessel wall of the power generator system of FIG. 1.

A power generation system 100 includes a reactor system 101, a turbine 104, a generator 105, and a fluid handling section 106, as shown in FIG. 1. Reactor system 101 includes a reactor vessel 102 and its internals, e.g., a core 108, a chimney 110, and a dryer 112. Vessel 102 has a cylindrical wall 114 and a semispherical top 116 and a semispherical bottom 118. Vessel 102 has a nominal water level 120 to which it is filled normally during operation. Reactor core 108 and chimney 110 are below nominal water level 120 so that they are normally immersed in water; dryer 112 is above level 120 so it is normally immersed in steam during reactor operation.

Chimney 110 includes forty-five chimney sections, as indicated in FIG. 2, including sections 1–12, 24–27 and 44–45. The chimney sections constitute four groups, a central first group 201, a second group 202, a third group 203 and a peripheral fourth group 204. Most of the chimney sections have square cross-sections like section 201. Fourth group 204 includes some half-size sections like section 44. The half-size sections allow chimney 110 to conform to wall 114 of vessel 102.

First group 201 includes a single section, section 1, which is taller than the remaining forty-four sections, as indicated in FIG. 1. The height of section 1 defines a first group height or extension. Second group 202 includes eight sections 2–9, radially outward and adjacent to first group section 1. These eight second group sections 2–9 share a common second group height less than the first group height but greater than the heights of the remaining more peripheral sections. Third group 203 includes sixteen sections, including sections 10–12 and 24–25. These third group sections are radially outward from and adjacent to second group 202 and share a common third group height which is less than the second group height. Fourth group 204 contains twenty sections, including sections 26–28 and 44–45, which are radially outward from the adjacent to third group 203. The sections of fourth group 204 share a common fourth group height less than the third group height. Since each group after the first group is shorter than those radially inward from it, chimney 110 is said to be staggered.

As indicated in FIG. 1, the difference between the second group height and the first group height is less than the difference between the third group height and the second group height. Likewise, the difference between the third group height and the second group height is less than the difference between the fourth group height and the third group height. In other words, the stagger of chimney 110 becomes steeper away from its axis through section 1.

Specific dimensions for the illustrated embodiment are approximately as follows. The chimney heights are 300 cm, 290 cm, 265 cm and 225 cm, respectively, for groups 201–204. The height differences between the first and second group is 10 cm, between the second and third group is 25 cm, and between the third and fourth group is 40 cm. This corresponds to a stagger which becomes progressively steeper toward the periphery. Square sections are 25 cm on each side and group 204 is 175 cm from side to opposing side. Vessel 102 is about 12 meters high and 2.8 meters in diameter. Core 108 is 190 cm high, the top 10 cm being inactive, and about 180 cm from side to opposing side. Core 108 has an octagonal cross section and its base is 2.4 meters above the center of vessel bottom 118. These dimensions correspond to those of the 60 megawatt reactor at Dodewaard, Holland. Reactor vessel 102 can be of carbon steel inside a stainless steel cladding, while chimney 110 can be of stainless steel.

Generally, circulation within vessel 102 proceeds with water flowing up through core 108, which converts water to steam. The heated fluid flows up through chimney 110 and forces water above chimney 110 radially outward toward cylindrical wall 114. The water flows downward through the downcomer annulus, the space between the cylindrical wall 114 and the chimney 110 and core 108. The water then flows below core 108, and upward again through core 108. Steam from chimney 102 proceeds upward past nominal water level 120, through dryer 112, out steam nozzle 122, and along steam line 124 to turbine 104. Turbine 104 is driven by the steam, and in turn drives a generator, generating electricity. Steam and condensation from turbine 104 proceed along fluid path 126 to fluid handling section 106. Fluid handling section 106 performs a variety of conventional functions including collection of condensation, preheating of the return water, and pumping of return water along feedwater line 128 feedwater sparger 130 in vessel 110. Feedwater sparger 130 is a toroid which includes a multitude of horizontally directed nozzles through which feedwater enters the recirculation fluid, quenching the carryunder. The returned water replenishes water from vessel 102 which has been converted to steam and output to turbine 104.

In a reactor system with a conventional, unstaggered, chimney, water displaced by the output of more central sections quickly sweeps fluid exiting a peripheral chimney section, for example, in the position corresponding to section 26 of FIG. 2, into the downflow between the chimney and the vessel wall. For this reason, there is little time for steam from a peripheral section to escape the recirculating flow, resulting in significant carryunder. In addition, an unstaggered chimney leaves little volume for separation for any of the sections. Thus, even more central sections contribute significant carryunder.

As is apparent from FIG. 1, staggering provides greater volume for steam to separate from the recirculating water flow: all the space between the tops of groups 202-204 and the level defined by the top of central group 201 is added to the volume available for separation. Furthermore, the flows from the different groups are largely decoupled. Arrows 211-214 indicate recirculation flow patterns from section 1 of group 1, section 2 of group 2, section 10 of group 3 and section 26 of group 4, respectively. Note that the flow 214 from section 26 can proceed upward a considerable distance before being swept radially outward by the combined flow of radially inward sections 1, 2, and 10. This extra upward clearance translates into critical separation time for peripheral group 204. The relatively steep step between the two most peripheral groups 203 and 204 accentuates this advantage. In addition, the staggering provides decoupling and additional separation time for second and third groups 202 and 203. Furthermore, the flow from central group 201 has additional separation time due to the greater total volume outside the chimney.

In a complementary fashion, staggering reduces carryover. Since there is more height available between the top of section 26 and water level 120, there is more separation time available for water to separate from the steam flow toward top 116 of vessel 102. This applies equally to the other sections of peripheral group 204, and, to a lesser but significant extent, to the sections of intermediate groups 202 and 203.

Further reduction of carryover can be accomplished by using a dryer which is elevation-staggered in a manner complementary to the chimney 110. Dryer 112 includes three annular elements 141, 142, and 143. Central dryer element 141 is disposed higher than intermediate dryer element 142, which, in turn is disposed higher than peripheral dryer element 143. This contrasts with a conventional arrangement in which dryer elements are arranged like a disk so that they are all at the same height within vessel 102.

The illustrated staggered dryer 112 takes advantage of the otherwise wasted space defined by semispherical top 116. The advantage is most pronounced for central dryer element 141. Note that this dryer element 141 is the one most directly over central section 1, which is also the section provided the least carryover advantage by the staggering of chimney 110. In other words, while staggerring chimney 110 did not add distance between the top of section 1 and water level 120, staggered dryer 112 does add distance between water level 120 and the dryer element 141 most directly above section 1. The staggerring of dryer 112 also provides benefits due to the higher position of intermediate dryer element 142. Peripheral dryer element 143 is at the height of a conventional dryer, but is most directly over the two peripheral groups 203 and 204, which have the least need for additional separation space above water level 120. Thus, staggered dryer 112 enhances the separation of water from the steam output and distributes this enhancement to provide separation where it is needed most.

The novel chimney geometry also improves the distribution of heat transfer from reactor core 108. Being a conventional core, core 108 is generating more power in its center and less power toward its periphery. Optimal heat removal would require heat to be removed faster from the core center and more slowly from the core periphery. This occurs to some extent in a conventional natural circulation boiling water reactor due to the greater heat flux at the core center between core and water. However, this temperature differential effect is not sufficient to provide optimal heat transfer distribution through the core.

The present invention more closely approaches optimal heat transfer by forcing water faster through the core center. For example, since section 1 is higher than other sections, it supports a taller column of steam. The taller column of steam results in a greater pressure differential between the fluid through the core and chimney and the water in the downcomer. The greater pressure differential results in a faster fluid flow through section 1 and the core center directly below. On the other hand, sections of peripheral group 204, e.g., section 26, support relatively short steam columns. This results in smaller pressure differentials and slower fluid flow through peripheral chimney sections and peripheral core regions below. Thus flow differences supplement the differences between density differentials among groups 201-204 to enhance the transfer of heat from core 108. Furthermore, reduced carryunder also enhances the ability of the recirculating water to remove heat from the core.

Thus, the geometries of the chimney and dryer provide reduced carryover and carryunder, yielding improved system efficiency. Reduced carryunder results in smaller core voids, and, thus, greater flow stability and greater margins for safety. Reduced carryover minimizes the escape of radioactive materials from the reactor vessel, enhancing the safety of the system. All these advantages are obtainable by modifying the geometries of the chimney and the dryer. There is no requirement for additional pumps, control loops or other items which might add to system complexity or diminish the inherent safety of the system.

The present invention provides a range of embodiments not described above. Different dimensions, materials, and power capabilities are provided for. It is not necessary that the reactor be used for generating electricity. Heat from the reactor can be used for some other purpose without an intermediate conversion in form. Coolants in addition to or other than water can be used. Steam or vapor used to transfer heat from a vessel can be recollected and returned to replenish fluid in the vessel. Alternatively, replenishment can be partially or completed effected by a separate fluid source. The invention can be practiced with or without a staggered dryer.

Many different chimney configurations are provided for. A central group can contain a single section or plural sections, for example four sections. The sections can have square cross sections or other cross sections suitable for dividing a chimney space. Rectangular, triangular and hexagonal sections are provided for. The overall chimney shape need not be square. As in the illustrated embodiment, all sections do not need to have the same shape or cross-sectional area. A chimney can have two, three, four or more radially arranged groups. Sections within a group can share a common height or have different heights, as long as averages show the appropriate relationship between groups. The reactor vessel can have different geometries, for example, the top and bottom need not be semispherical. These and other modifications to and variations upon the described embodiments are provided for by the present invention, the scope of which is limited only by the following claims.

What is claimed is:

1. A reactor system comprising:
   a reactor vessel having a vertical, cylindrical wall with a top and a bottom, and containing water up to a nominal water level;
   a reactor core disposed in said vessel below said nominal water level for generating heat to boil said water to produce steam;
   a chimney disposed within said vessel below said nominal water level and above said core, said chimney including:
   a plurality of vertically extending sections, each of said sections being defined by enclosing sides and having a bottom entrance disposed in flow communication with said core for receiving heated fluid therefrom, and a top exit facing upwardly below said nominal water level for discharging thereto without obstruction said heated fluid channeled through said section;
   said sections defining a radially extending array including a first group having at least one of said sections, and a second group having a plurality of said sections arranged in an annular series circumferentially around said first group, with said first group being disposed radially inwardly of said second group; and
   said first group having a height being taller than a height of said second group for discharging said heated fluid channeled therethrough at a higher level than said heated fluid channeled through said second group;
   said core and said chimney being disposed in said vessel to define with said cylindrical wall a downcomer annulus therebetween, to define between tops of said chimney groups and said nominal water level an upper space, and to define below said core a lower space for allowing recirculation flow upwardly through said core and said chimney, radially outwardly through said upper space toward said cylindrical wall, downwardly through said downcomer annulus into said lower space, and upwardly into said core; and
   a steam dryer disposed in said vessel above said nominal water level and said chimney and being elevation-staggered complementarily with said chimney, said dryer including a central dryer element and a peripheral dryer element disposed radially therearound, said central dryer element being disposed higher than said peripheral dryer element and directly over said first group.

2. A system as recited in claim 1 wherein said chimney further comprises a third group having a plurality of said sections being disposed radially outward of said second group of sections, said third group of sections having a height being less than said second group height for discharging into said upper space said heated fluid channeled therethrough at a lower level than said heated fluid channeled through said second group.

3. A system as recited in claim 2 wherein the difference between said second group height and said first group height is less than the difference between said third group height and said second group height.

4. A system as recited in claim 2 wherein said second group includes plural sections arranged in an inner annular series, said third group including plural sections arranged in an outer annular series, the number of sections in said outer annular series being greater than the number of sections in said inner annular series.

5. A system according to claim 2 wherein said chimney further comprises a peripheral fourth group having a plurality of said sections disposed radially outwardly from and adjacent to said third group, and having a height being less than said third group height for discharging into said upper space said heated fluid channeled therethrough at a lower level than said heated fluid channeled through said third group.

6. A system according to claim 5 wherein the difference between said third group height and said second group height is less than the difference between said fourth group height and said third group height.

7. A system according to claim 5 wherein said sections of said first, second, and third groups are substantially identical in configuration, and said sections of said fourth group vary in configuration to conform to said cylindrical wall.

8. A system according to claim 7 wherein said sections of said first, second, and third groups have square configurations, and said sections of said fourth group include rectangular configurations.

9. A system according to claim 1 further comprising:
   a third chimney group having a plurality of said sections disposed radially around said second group and having a height less than said second group height;
   a fourth chimney group having a plurality of said sections disposed radially around said third group and having a height less than said third group height;

an intermediate dryer element disposed radially between said central and peripheral dryer elements, with said central dryer element being disposed higher than said intermediate dryer element, and said intermediate dryer element being disposed higher than said peripheral dryer element; and said peripheral dryer element being disposed directly above said fourth group.

* * * * *